(12) United States Patent
Mruthyunjaya et al.

(10) Patent No.: US 8,874,887 B2
(45) Date of Patent: Oct. 28, 2014

(54) FAST BOOTING COMPUTER APPARATUSES AND METHODS THEREOF

(75) Inventors: Subrahmanya R. Mruthyunjaya, Bangalore (IN); Srikanth M. Reddy, Bangalore (IN)

(73) Assignee: Infosys Technologies, Ltd., Bangalore (IN)

( * ) Notice: Subject to any disclaimer, the term of this patent is extended or adjusted under 35 U.S.C. 154(b) by 550 days.

(21) Appl. No.: 13/221,133

(22) Filed: Aug. 30, 2011

(65) Prior Publication Data
US 2012/0260079 A1    Oct. 11, 2012

(30) Foreign Application Priority Data
Apr. 7, 2011  (IN) .............................. 1183/CHE/2011

(51) Int. Cl.
*G06F 9/00* (2006.01)
*G06F 12/00* (2006.01)
*G06F 9/44* (2006.01)

(52) U.S. Cl.
CPC .................................. *G06F 9/4401* (2013.01)
USPC ............................................... 713/2; 711/104

(58) Field of Classification Search
CPC ........................................................ G06F 9/4406
USPC ............................................... 713/2; 711/104
See application file for complete search history.

(56) References Cited

U.S. PATENT DOCUMENTS

| 7,975,105 B1* | 7/2011 | Sun et al. ...................... 711/115 |
| 2009/0013165 A1* | 1/2009 | Chow et al. ...................... 713/2 |
| 2011/0252178 A1* | 10/2011 | Wang et al. ................... 710/316 |

* cited by examiner

*Primary Examiner* — Stefan Stoynov
(74) *Attorney, Agent, or Firm* — LeClairRyan, a Professinal Corporation

(57) ABSTRACT

A fast booting computer apparatus includes one or more processors and a memory comprising a hard disk drive and a solid state drive coupled to the one or more processors. The one or more processors are configured to execute programmed instructions stored in the memory. The solid state drive is configured to store and provide the programmed instructions for an operating system for execution by the one or more processors when requested.

14 Claims, 2 Drawing Sheets

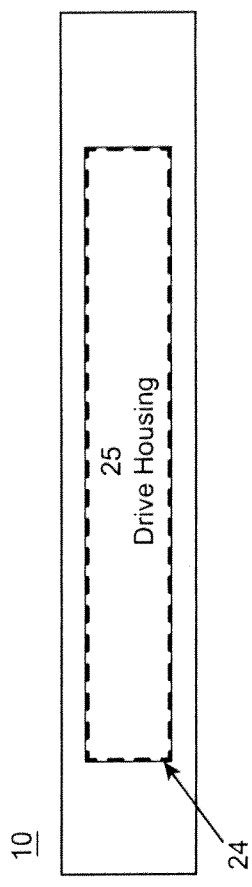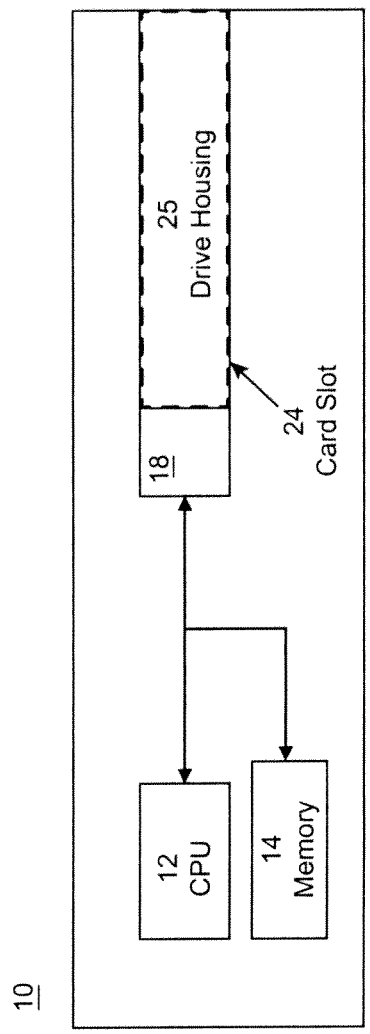

FAST BOOTING COMPUTER APPARATUSES AND METHODS THEREOF

This application claims the benefit of Indian Patent Application Filing No. 1183/CHE/2011, filed Apr. 7, 2011, which is hereby incorporated by reference in its entirety.

FIELD

This technology relates to fast booting computer apparatuses and methods thereof.

BACKGROUND

Typically, computing devices utilize hard disk drives for data storage. These hard disk drives have rotatable rigid platters located on a motor-driven spindle along with an actuator with a read/write head which are housed within a protective enclosure. With these hard disk drives, data can be magnetically read from and written to the platter by the read/write head that floats on a film of air above the platters.

Since their introduction, the cost and physical size of these hard disk drives have fallen while the storage capacity has increased. Additionally, average access time and latency time with hard disk drives have improved. Nevertheless, there are ongoing pressures to further reduce the access time and latency time associated with hard disk drives, particularly when booting an operating system at start up in a computer device.

The introduction of solid state drives has provided an alternative to the use of hard disk drives in computer apparatuses. Solids state drives are storage devices that store persistent data on solid-state flash memory. These solid state drives have lower access time and latency time than hard disk drives. Unfortunately, these solid state drives are still more expensive than hard disk drives and have other performance challenges, currently preventing the wholesale replacement of hard disk drives with solid state drives.

Currently, some laptops, netbooks, and other computing systems are being manufactured and sold with a preinstalled operating system burnt into memory. Although the pre-installation of these operating systems is convenient for some customers, it severely limits flexibility because the end user has no ability to change the preinstalled operating system to one that may be more suitable.

SUMMARY

A fast booting computer apparatus includes one or more processors and a memory comprising a hard disk drive and a solid state drive coupled to the one or more processors. The one or more processors are configured to execute programmed instructions stored in the memory. The solid state drive stores and provides the programmed instructions for an operating system for execution by the one or more processors when requested.

A method for making a fast booting computer apparatus includes providing one or more processors and coupling a memory comprising a hard disk drive and a solid state drive to the one or more processors. The one or more processors are configured to execute programmed instructions stored in the memory. The solid state drive stores and provides the programmed instructions for an operating system for execution by the one or more processors when requested.

A fast booting solid state drive apparatus includes a portable drive housing having an outer shape configured to detachably mate with an opening with a connecting interface in a computer apparatus, a control processor in the drive housing, and one or more memory components coupled to the one or more processors and in the drive housing. The one or more memory components store the programmed instructions for one or more operating systems. An interface element in the solid state drive apparatus is coupled to the control processor and the one or more memory components. The interface element is configured to detachably couple to a corresponding interface element in the computer apparatus to provide the programmed instructions for the operating system when requested.

A method for making a fast booting solid state drive apparatus includes providing a portable drive housing having an outer shape configured to detachably mate with an opening with an interface element in a computer apparatus, providing a control processor in the drive housing, and coupling one or more memory components to the one or more processors in the drive housing. The one or more memory components store the programmed instructions for an operating system. A connecting interface in the solid state drive apparatus is coupled to the control processor and the one or more memory components. The connecting interface is configured to detachably couple to the interface element in the computer apparatus to provide the programmed instructions for the operating system when requested.

This technology provides a number of advantages including providing cost effective and faster booting computer apparatuses and methods. With some examples of this technology, a solid state drive is solely used to store and load an operating system at start up while a hard disk drive is used for all other hard drive data storage operations in the computer apparatus, although other examples may have different configurations on what may be stored on the portable solid state drive. For example, the portable solid state drive with the programmed instructions for the operating system also can be configured to completely replace all data storage and other functions of the hard disk drive which no longer would be necessary. The use of the solid state drive for providing the programmed instructions for the operating system provides a substantial improvement in boot time, while remaining cost effective because a less expensive solid state drive can be utilized since in this example it is only required to load and start the operating system while a hard disk drive is utilized for any remaining hard drive data storage operations. Examples of this technology also may provide for multiple operating systems on the solid state drive for selection by the end user at startup to provide the end user even greater flexibility in selecting a different operating system.

Additionally, examples of this technology provide portable solid state drives with pre-installed operating systems which can easily be detachably coupled to the computer apparatus to provide an end user greater flexibility in easily selecting and using a different operating system. With this example of the technology, the solid state drive is enclosed within a portable housing that has an outer shape configured to detachable mate within an opening in the computer apparatus and to load the preinstalled operating system when initiated. As a result, with this technology the end user has much greater flexibility in selecting and easily changing the operating system for the end user's computing apparatus as often as desired. The end user simply needs to select and plug in a solid state drive with the desired operating system, such as Windows or Linux, into a compatible connecting slot in the computing apparatus. Further, with this technology vendors of operating systems can now provide their operating systems pre-installed on portable solid state drives that can simply be plugged in to a computer apparatus as desired by the end user.

BRIEF DESCRIPTION OF THE DRAWINGS

FIG. 2 is a side view of the exemplary fast booting computer apparatus; and

FIG. 3 is a partial block and partial cross-sectional view of the exemplary fast booting computer apparatus.

DETAILED DESCRIPTION

Figure 1:
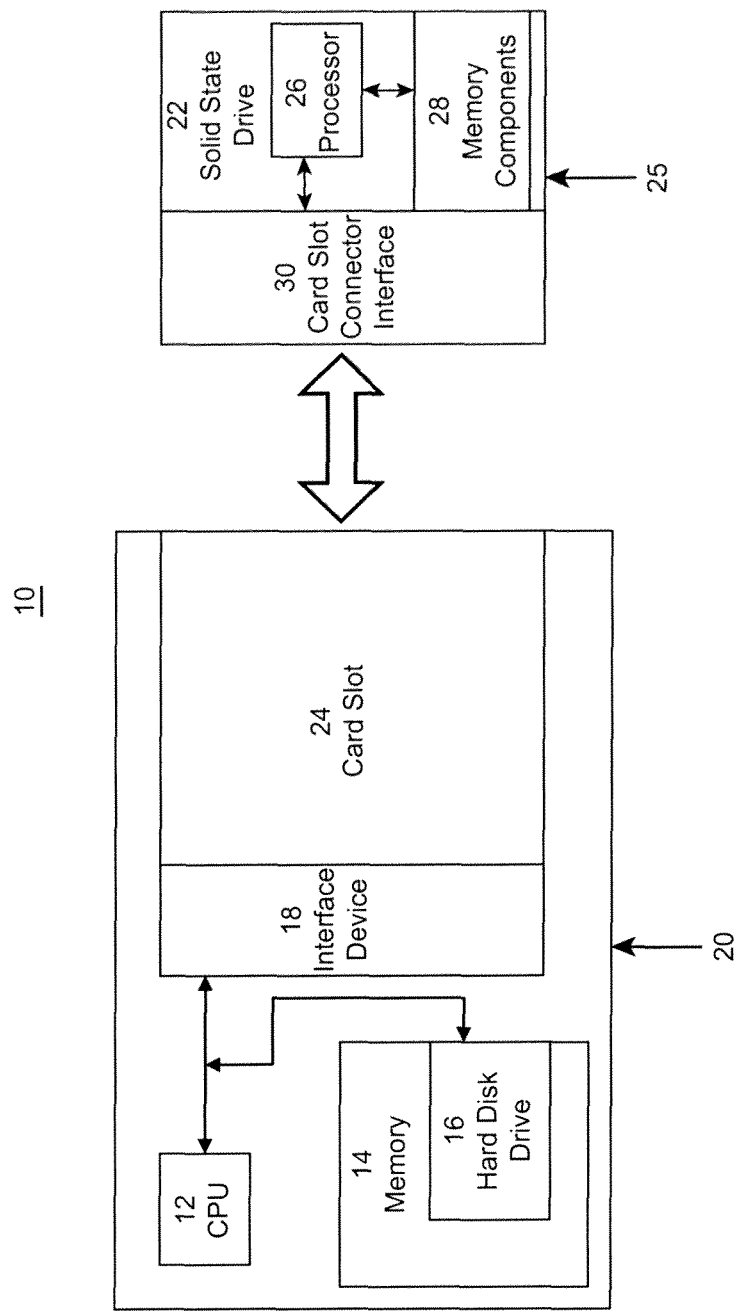
FIG. 1 is a block diagram of an exemplary fast booting computer apparatus.

An exemplary fast booting computer apparatus 10 is illustrated in FIGS. 1-3. The exemplary fast booting computer apparatus 10 includes a processor 12, a memory 14 including a hard disk drive 16, and an interface device 18 which are coupled together by a bus or other communication link and enclosed within a computer apparatus housing 20 along with a detachable solid state drive 22 enclosed within a drive housing 25 configured to mate within a connecting opening 24 to the interface device 18, although the apparatus can comprise other types and numbers of systems, devices, components and elements in other configurations, such as an integrated solid state drive. This technology provides a number of advantages including providing cost effective and faster booting computer apparatuses and methods. Additionally, this technology provides separate solid state drives with pre-installed operating systems which can easily be detachably coupled to the computer apparatus to provide an end user greater flexibility in selecting and installing a different operating system.

Referring more specifically to FIGS. 1-3, the processor 12 in the fast booting computer apparatus 10 is configured to execute programmed instructions for one or more applications stored in memory 14 or otherwise provided to the processor 12 for execution. The memory 14 in the fast booting computer apparatus 10 includes the hard disk drive 16 which is coupled to the processor 12, although the memory 14 can comprise other numbers and types of memory storage devices, such as a random access memory (RAM) or a read only memory (ROM), that are coupled to the processor 12 in the fast booting computer apparatus 10. The memory 14 including the hard disk drive 16 store the programmed instructions for one or more applications for execution by the processor 12 and other data as illustrated and described in the examples herein, although some or all of the programmed instructions and data could be stored elsewhere.

The interface device 18 device is used to operatively couple and communicate between the CPU 12 and solid state drive 22 when detachably coupled together, although other types and numbers of connections and configurations to other types and numbers of systems, devices, and components could be used. In this example, the interface device 18 includes a card slot 24, such as a PCMCIA slot by way of example only, which is configured to detachable mate and couple with a card slot connecting interface 30 for the solid state drive 22, although other manners for coupling the detachable solid state drive 22 could be used. Additionally, in this example when the solid state drive 22 in the drive housing 25 is inserted in the card slot 24 and detachably coupled to the interface device 18, the solid state drive 22 and drive housing 25 are completely disposed within the computer apparatus 10, although the solid state drive 22 could be in other types of packaging which is coupled to the interface device 18 of the computer apparatus in other manners. In this configuration with the solid state drive 22 in the drive housing 25 completely disposed in the computer apparatus 10, the solid state drive 22 in the drive housing 25 does not provide any protrusions which could interfere with normal use of the computer apparatus 10, although other examples where the solid state drive 22 in the drive housing 25 protrude from the computer apparatus housing 20 could be used.

The computer apparatus housing 20 encloses the processor 12 and memory 14 including the hard disk drive 16 and the interface device 18 with an opening for the card slot 24, although the housing could enclose other types and numbers of systems, devices, components and elements in other configurations. The interface device 18 is positioned in the card slot 24 to detachably couple with a card slot connector interface 30 when the solid state drive 22 in the drive housing 25 is inserted in the card slot 24.

The detachable solid state drive 22 includes a control processor 26 coupled to memory components 28 and to card slot connecting interface 30, although other types of solid state drives with other types and numbers of systems, devices, components and other elements in other configurations could be used. In this example, the solid state drive 22 includes the control processor 26 which is configured to executes stored programmed instructions to manage operations of the solid state drive 22 including interactions with memory components 28.

A drive housing 25 encloses the control processor 26 and memory components 28, although the drive housing could cover other types and numbers of systems, devices, components and elements in other configurations. Although in this example the solid state drive 22 is detachable, the solid state drive 22 also could be integrated with the other components in computer apparatus housing 20. Additionally, in other examples the solid state drive 22 may store multiple operating systems and may prompt a end user on a display (not shown) using a user input device (not shown) to select one of the stored operating systems for use on the fast booting computer apparatus 10. This provides the end user even greater flexibility in not only inserting a solid state drive 22 with a different operating system, but in this example also allowing the end user to select one of multiple operating systems pre-installed on the solid state drive 22.

In this particular example, the solid state drive 18 is solely used to store and assist with loading programmed instructions for an operating system for the fast booting computer apparatus 10, while all other hard drive data and instructions, such as user data, application date, OS log files, backups, and other administrative writes, are stored on the hard disk drive 16, although as noted above other configurations could be used, such as completely replacing the hard disk drive with the portable solid state drive. This provides a substantial improvement in boot time, while remaining cost effective because a less expensive solid state drive 22 can be utilized in the fast booting computer apparatus 10 since it is only required to load and start the operating system preinstalled on the solid state drive 22 while the hard disk drive 16 is utilized for any remaining hard drive data storage operations. Although in this example, the solid state drive 22 only stores the programmed instructions for the operating system, in other examples the portable solid state drive 22 could store other types of data and the portable solid state drive 22 could completely replace the hard disk drive 16 in the computer apparatus 10.

An exemplary method for fast booting a computer apparatus 10 will now be described with reference to FIGS. 1-3. An operator may select one of multiple detachable solid state drives 22 in drive housings 24 for use with the computer apparatus 10. Once the detachable solid state drive 22 with the desired operating system which has already been pre-installed is selected, the device housing 25 for the solid state drive 22 is inserted in the card slot 24 in the computer apparatus 10. The end user continues to push in the device housing 25 in the card slot 24 until the connecting interface 30 for the solid state drive 22 is detachably coupled to the interface device 18 in the computer apparatus 10 and the solid state drive 22 and drive housing 25 are fully enclosed in the computer apparatus 10, although other manners for detachably coupling or otherwise connecting the devices could be used.

Once the detachable solid state drive is detachably coupled into the computer apparatus 10, the programmed instructions for the operating system are loaded from the solid state drive 22 for execution by the CPU 12 in the computer apparatus 10. If the solid state drive 22 has multiple operating systems stored, the end user may be prompted to select one for use with the computer apparatus 10. Accordingly, with the detachable solid state drive 16, the end user can easily, quickly, and seamlessly select a solid state drive 22 which has a desired operating system and detachably insert and install it in a computer apparatus 10.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A fast booting computer apparatus comprising:
   one or more processors; and
   a memory comprising an internal memory which comprises a hard disk drive coupled to the one or more processors and a separate portable memory consisting of a solid state drive detachably coupled to the one or more processors and that stores solid state programmed instructions consisting of operating system programmed instructions for an operating system, the one or more processors configured to execute the operating system programmed instructions stored in the separate portable memory consisting of the solid state drive and other programmed instructions stored in the internal memory comprising:
      loading the stored solid state programmed instructions consisting of the operating system programmed instructions for the operating system when the separate portable member is detachably coupled to the one or more processors; and
      executing the loaded solid state programmed instructions consisting of the operating system programmed instructions for the operating system.

2. The apparatus as set forth in claim 1 wherein the solid state drive stores the solid state programmed instructions consisting of the operating system programmed instructions for two or more of the operating systems and wherein the one or more processors are further configured to execute the operating system programmed instructions stored in the separate portable memory consisting of the solid state drive and other programmed instructions stored in the internal memory further comprising:
   prompting an end user to select the operating system programmed instructions for one of the two or more operating systems;
   wherein the loading loads the operating system programmed instructions for the selected one of the two or more operating systems and the executing executes the operating system programmed instructions for the selected one of the two or more operating systems.

3. The apparatus as set forth in claim 1 further comprising:
   a computer apparatus housing that encloses the one or more processors and the internal memory; and
   a drive housing that encloses the separate portable memory consisting of the solid state drive and is separate from the computer apparatus housing, the separate portable memory consisting of the solid state drive has a connection element that detachably couples with a corresponding connection element in the computer apparatus housing.

4. The apparatus as set forth in claim 3 wherein the computer apparatus housing has an opening with an interface device adapted to receive a connecting interface of the separate portable memory consisting of the solid state drive to provide a detachable coupling.

5. A method for making a fast booting computer apparatus, the method comprising:
   providing one or more processors; and
   coupling a memory to the one or more processors, the memory comprising an internal memory which comprises a hard disk drive coupled to the one or more processors and a separate portable memory consisting of a solid state drive detachably coupled to the one or more processors and that stores solid state programmed instructions consisting of operating system programmed instructions for an operating system, the one or more processors configured to execute the operating system programmed instructions stored in the separate portable memory consisting of the solid state drive and other programmed instructions stored in the internal memory comprising:
      loading the stored solid state programmed instructions consisting of the operating system programmed instructions for the operating system when the separate portable memory is detachable coupled to the one or more processors; and
      executing the loaded solid state programmed instructions consisting of the operating system programmed instructions for the operating system.

6. The method as set forth in claim 5 wherein the solid state drive stores the solid state programmed instructions consisting of the operating system programmed instructions for two or more of the operating systems and wherein the one or more processors are further configured to execute the operating system programmed instructions stored in the separate portable memory consisting of the solid state drive and other programmed instructions stored in the internal memory further comprising:
   prompting an end user to select the operating system programmed instructions for one of the two or more operating systems;
   wherein the loading loads the operating system programmed instructions for the selected one of the two or more operating systems and the executing executes the operating system programmed instructions for the selected one of the two or more operating systems.

7. The method as set forth in claim 5 further comprising:
   enclosing the one or more processors and the internal memory with a computer apparatus housing;

enclosing the separate portable memory consisting of the solid state drive with a drive housing that is separate from the computer apparatus housing, the separate portable memory consisting of the solid state drive is provided with a connection element that detachably couples with a corresponding connection element provided in the computer apparatus housing.

8. The method as set forth in claim 7 wherein the computer apparatus housing has an opening with an interface device adapted to receive a connecting interface of the separate portable memory consisting of the solid state drive to provide a detachable coupling.

9. A fast booting solid state drive apparatus comprising:
a portable drive housing having an outer shape configured to detachably mate with an opening which has an interface element in a computer apparatus;
a processor in the drive housing; and
one or more memory components coupled to the processor and in the drive housing, the one or more memory components storing the programmed instructions consisting of programmed instructions for one or more operating systems; and
a connecting interface coupled to the control processor and the one or more memory components, the connecting interface configured to detachably couple to the interface element in the computer apparatus to provide the programmed instructions consisting of the programmed instructions for the one or more operating systems when requested.

10. The apparatus as set forth in claim 9 wherein the one or more memory components store the programmed instructions consisting of two or more of the operating systems.

11. The apparatus as set forth in claim 9 wherein the interface element further comprises a card slot connecting interface to provide a detachable coupling.

12. A method for making a fast booting solid state drive apparatus, the method comprising:
providing a portable drive housing having an outer shape configured to detachably mate with an opening which has an interface element in a computer apparatus;
providing a processor in the drive housing; and
coupling one or more memory components to the processor in the drive housing, the one or more memory components storing the programmed instructions consisting of programmed instructions for one or more operating systems; and
coupling a connecting interface to the control processor and the one or more memory components, the connecting interface configured to detachably couple to the interface element in the computer apparatus to provide the programmed instructions consisting of the programmed instructions for the one or more operating systems when requested.

13. The method as set forth in claim 12 wherein the one or more memory components store the programmed instructions consisting of two or more of the operating systems.

14. The method as set forth in claim 12 wherein the interface element further comprises a card slot connecting interface to provide a detachable coupling.

\* \* \* \* \*